United States Patent
Popovic et al.

(10) Patent No.: US 6,956,830 B2
(45) Date of Patent: Oct. 18, 2005

(54) LINE ECHO CANCELLATION SYSTEM

(75) Inventors: Mirjana Popovic, Ottawa (CA); Dieter Schulz, Dunrobin (CA); Jan Radecki, Ottawa (CA)

(73) Assignee: Mitel Knowledge Corporation, Ottawa (CA)

( * ) Notice: Subject to any disclaimer, the term of this patent is extended or adjusted under 35 U.S.C. 154(b) by 266 days.

(21) Appl. No.: 10/448,155

(22) Filed: May 29, 2003

(65) Prior Publication Data

US 2003/0223575 A1 Dec. 4, 2003

(30) Foreign Application Priority Data

May 29, 2002 (GB) .............................................. 0212397

(51) Int. Cl.[7] .............................................. H04B 3/20
(52) U.S. Cl. ...................... 370/286; 370/288; 370/289; 370/290; 379/406.01; 379/406.05; 379/406.06
(58) Field of Search ............................... 370/278, 285, 370/286, 289, 290, 291, 293; 379/3, 8, 406.01, 406.05, 406.06, 406.08, 406.09

(56) References Cited

U.S. PATENT DOCUMENTS

| | | | |
|---|---|---|---|
| 4,587,382 A | | 5/1986 | Yang |
| 5,721,782 A | | 2/1998 | Piket et al. |
| 5,761,638 A | | 6/1998 | Knittle et al. |
| 5,999,901 A | | 12/1999 | Knittle et al. |
| 2003/0235294 A1 | * | 12/2003 | Dyba et al. ............. 379/406.01 |
| 2004/0037417 A1 | * | 2/2004 | Seibert .................. 379/406.01 |

FOREIGN PATENT DOCUMENTS

| | | |
|---|---|---|
| CA | 2319639 | 3/2001 |
| EP | 1 104 116 A2 | 5/2001 |
| EP | 1 130 796 A2 | 9/2001 |
| WO | WO 98/00860 | 1/1998 |
| WO | WO 98/00960 | 1/1998 |
| WO | WO 98/34353 | 8/1998 |

* cited by examiner

*Primary Examiner*—Wellington Chin
*Assistant Examiner*—Raj Jain
(74) *Attorney, Agent, or Firm*—Fay, Sharpe, Fagan, Minnich & McKee, LLP

(57) ABSTRACT

An echo cancellation system for detecting and canceling echo from a network speech path, comprising a pool of echo locators for detecting pure echo delay and dispersion of time, a pool of echo cancellers, a pool of line watchdogs for detecting presence or absence of echo in the network speech path, and a control system for (i) locating and applying an echo locator from the pool of echo locators to the network speech path for detecting the pure echo delay and dispersion of time of any echo in the network speech path, and thereafter returning the echo locator to the pool of echo locators; (ii) locating and applying an echo canceller from the pool of echo cancellers to the network speech path for canceling the echo using the pure delay and dispersion time, and thereafter returning the echo canceller to the pool of echo cancellers; and (iii) locating and applying a line watchdog from the pool of line watchdogs to the network speech path for detecting said presence or absence of echo, and in the event the presence of said echo is detected then re-executing (i).

8 Claims, 2 Drawing Sheets

LINE ECHO CANCELLATION SYSTEM

FIELD OF THE INVENTION

This invention relates generally to echo cancellers, and more particularly to a system for monitoring a network for the presence of echo, determining the pure echo delay and the dispersion time of the echo impulse response and in response applying an echo canceller for performing echo adaptation only in the dispersion time.

BACKGROUND OF THE INVENTION

Echo cancellers are well known in the art for providing cancellation of echoes resulting from imperfect impedance matching by hybrids in two-to-four wire signal conversion. Prior art adaptive linear echo cancellers (LECs) employing the Least Mean Square (LMS) algorithm are useful in quickly adapting to changes in the echo path response. However, such systems are computationally complex and slow in adapting to changes in the echo path or a sudden onset of echo during a call.

It is also known from the prior art to use complex and expensive echo locators for the purpose of determining echo delay and the dispersion time.

The following patents are exemplary of the prior art:
CA2319639 entitled Locating Network Echos, by Popovic et al, dated Mar. 14, 2000.
U.S. Pat. No. 5,721,782 entitled Partitioned Echo Canceller Utilizing Decimation Echo Location, by Piket et al, dated Feb. 24, 1998.
U.S. Pat. No. 5,761,638 entitled Telephone Network Apparatus and Method Using Echo Delay and Attenuation, by Knittle et al, dated Jun. 2, 1998.
U.S. Pat. No. 5,999,901 entitled Telephone Network Apparatus and Method Using Echo Delay and Attenuation, by Knittle et al, dated Dec. 7, 1999.
U.S. Pat. No. 5,511,064 entitled Speech Path Switching Control Apparatus and Method for Making Maintenance of Speech Possible Upon Occurrence of Fault in Echo Cancellation, by Oh et. al, dated Apr. 23, 1996.

SUMMARY OF THE INVENTION

One object of an aspect of the present invention is to reduce complexity of echo cancellation systems, while providing robust echo cancellation. Therefore, in accordance with the invention there is provided an echo cancellation system comprising a line echo locator, line echo canceller, and a line watchdog. The line echo locator monitors the speech path, and if echo is present a control system locates and applies the echo canceller, otherwise it locates and applies the line watchdog to the speech path. The echo cancellation system of the present invention also assures good echo performance in the case when the echo path changes or in the event that an echo occurs later during the call.

BRIEF DESCRIPTION OF THE DRAWINGS

A detailed description of the invention is set forth herein below, with reference to the following drawings, in which.

DETAILED DESCRIPTION OF THE PREFERRED EMBODIMENT

Figure 1:
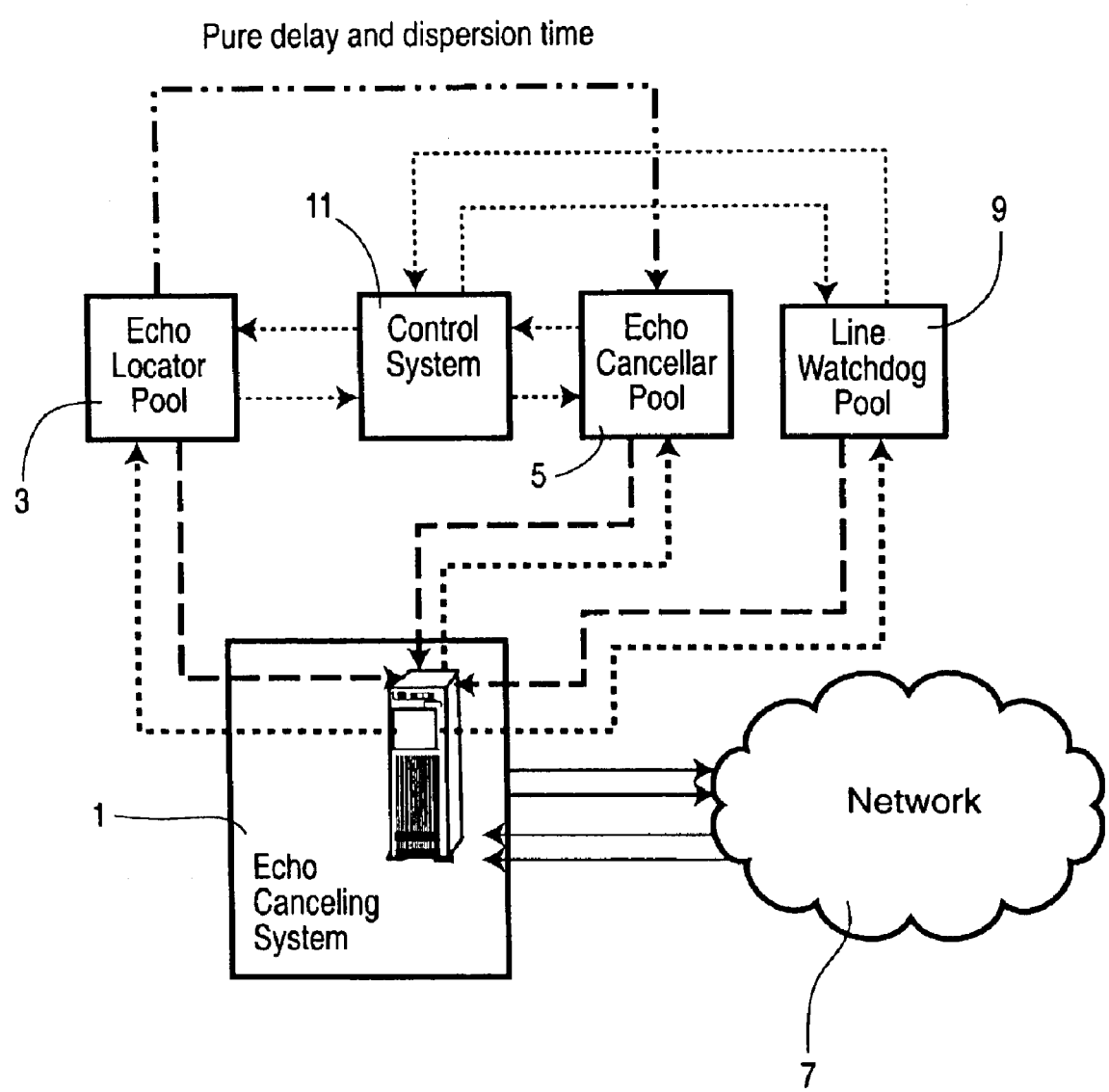
FIG. 1 is a block diagram of an echo cancellation system according to the present invention.

In the system of FIG. 1, echo cancellation system 1 represents any one of an echo canceller, echo locator or line watchdog from the echo canceller pool 5, echo locator pool 3, or line watchdog pool 9, respectively, which has been located and applied to a speech path in the network 7 under control of control system 11. In accordance with an important aspect of the present invention, the echo canceller is located and applied if and only if echo is present. The structure and operation of the echo canceller and echo locator are well known in the art.

In operation, at the start of a call an echo locator is located in the network speech path at 1 from the echo locator pool 3, under control of the control system 11. The heavy dashed lines in FIG. 1 represent location and application of a device from one of the pools 3, 5 or 9. The echo locator is capable of detecting any echo in a short time period and determining the pure echo delay and the dispersion time of the echo impulse response. If echo is present then the echo locator sends a request to the control system 11 for an echo canceller together with the detected pure delay and the span of the dispersion region (i.e. the dash and double-dot line in FIG. 1). The echo locator is returned by the control system 11 to the pool 3, as shown by the dotted lines parallel to the heavy dashed lines in FIG. 1. Preferably, the echo locator is of the type described in commonly-owned CA 2319639 (Locating Network Echoes).

The echo canceller is then located in the speech path at 1 and provides adaptation only in the dispersion time determined by the echo locator. All coefficients beyond the dispersion time are modeled as zero. If the echo path changes, thereby resulting in divergence or loss of adaptation, the echo canceller sends a request for a further echo locator and the echo canceller is returned to the pool 5. After estimation of the new echo path response, the pure delay and the dispersion time are transferred to a newly located echo canceller, and the further echo locator is returned to the pool 3.

In the event that the echo locator detects no echo during a predetermined time out period, the echo locator sends to the control system 11 a request for location of the line watchdog on the network speech path and the echo locator is returned to the pool 3. The line watchdog is implemented using a simple algorithm to provide a binary statement for indicating whether echo is present or absent. When network speech path conditions change resulting in echo, the line watchdog sends a request for an echo locator, and the watchdog is returned to the pool 9.

Figure 2:
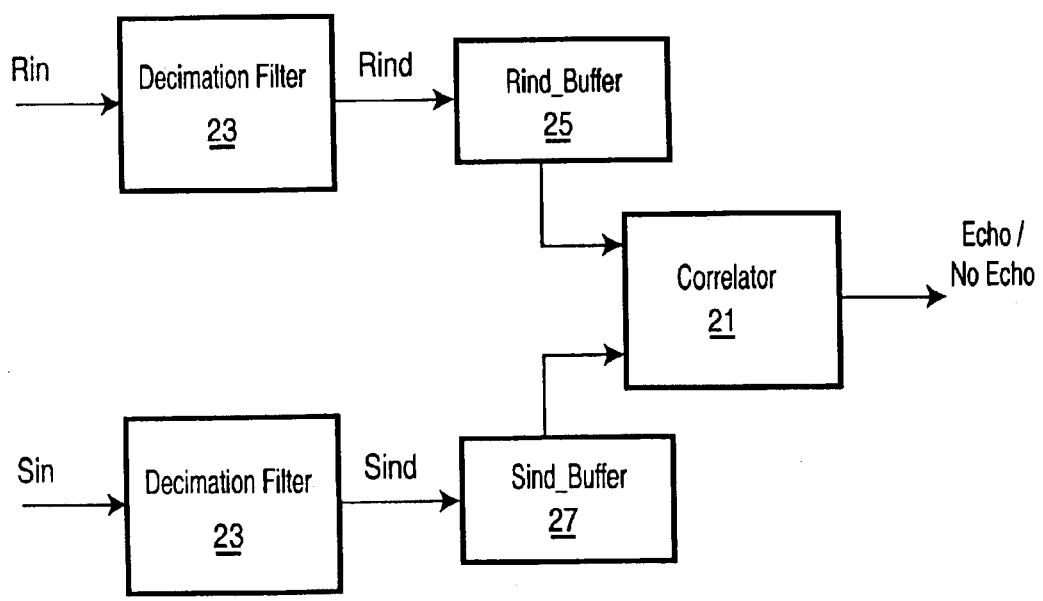
FIG. 2 is a block diagram showing operation of a line watchdog of the line echo cancellation system according to the preferred embodiment.

The line watchdog functionality is based on a cross-correlation $CR_{rs}$ between Far End (Rin) and Near End (Sin) signals, as shown in FIG. 2. The cross-correlation 21 performs in the decimation mode with a sampling rate reduction M—where M is a positive number. Rin and Sin signals are filtered by a decimation filter 23 and after filtering are downsampled by M, to produce Rind and Sind signals. The samples Rind fill up a buffer 25 (Rind_Buffer) and the Sind samples fill up a buffer 27 (Sind_Buffer) until the buffers are full. When the buffers 25 and 27 are full the cross-correlation is calculated to the maximum time shift $$\text{max\_lag} = \text{Tail\_End\_Delay}/M.$$

The cross-correlation is calculated on the finite-duration sequences of samples with length $N_{cr} < \text{max lag}$. The smaller value of $N_{cr}$ allows for the generation of a correlation estimation from which it it is possible to estimate whether signals are correlated or not while using only a small number of mathematical operations. At each sample, the cross-correlation is calculated only for one time shift. Therefore, the cross-correlation coefficients are obtained after max_lag number of samples. After the cross-correlation coefficients are calculated, a decision is made as to whether Rin is correlated with Sin. If it is, the echo locator is called up and if not then the filtering process, buffer filling, and calculation of the cross-correlation is continued.

The following is an exemplary pseudo-code for the line watchdog of the preferred embodiment:

```
M - decimation factor
Initial values:
max_lag = Tail_End_Delay / M   // Tail_End_Delay - max. echo path delay
Initialize Ncr to max_lag or less
State Watchdog:
BEGIN
    Decimate Rin and store in Rind_buff
    Decimate Sin and store in Sind_buff
    REPEAT
        Cross correlate Rind and Sind over Window Ncr (CRrs)
        Shift Sind relative to Rind
    UNTIL max_lag samples
    IF Sind correlated to Rind
        Flag ECHO PRESENT
        (Go to Echo Locator state)
    ELSE // Sind not correlated to Rind
        Remain in Watchdog state
END
```

A person of skill in the art may conceive of modifications and alternative embodiments of the invention, all of which are believed to be within the sphere and scope of the invention as set forth in the claims appended hereto.

What is claimed is:

1. An echo cancellation system for detecting and canceling echo from a network speech path, comprising:
   a pool of echo locators for detecting pure echo delay and dispersion of time;
   a pool of echo cancellers;
   a pool of line watchdogs for detecting presence or absence of echo in said network speech path; and
   a control system for (i) locating and applying an echo locator from said pool of echo locators to said network speech path for detecting said pure echo delay and dispersion of time of any echo in said network speech path, and thereafter returning said echo locator to said pool of echo locators; (ii) locating and applying an echo canceller from said pool of echo cancellers to said network speech path for canceling said echo using said pure delay and dispersion time, and thereafter returning said echo canceller to said pool of echo cancellers; and (iii) locating and applying a line watchdog from said pool of line watchdogs to said network speech path for detecting said presence or absence of echo, and in the event the presence of said echo is detected then re-executing (i).

2. The echo cancellation system of claim 1, wherein said echo canceller comprises a digital filter for providing adaptation only in the dispersion time determined by the echo locator, all coefficients beyond the dispersion time being modeled as zero.

3. The echo cancellation system of claim 1, wherein said line watchdog comprises:
   a correlator for performing cross-correlation of Far End (Rin) and Near End (Sin) signals in said network speech path and, in the event said signals are correlated then indicating said echo is detected and re-executing (i).

4. The echo cancellation system of claim 3, wherein said line watchdog further comprises a pair of decimation filters for downsampling said Far End (Rin) and Near End (Sin) signals to produce downsampled signals Rind and Sind.

5. The echo cancellation system of claim 4, wherein said line watchdog further comprises a pair of buffers for storing and applying said downsampled signals Rind and Sind signals to said correlator.

6. A method of detecting and canceling echo from a network speech path, comprising:
   (i) locating and applying an echo locator from a pool of echo locators to said network speech path for detecting pure echo delay and dispersion of time of any echo in said network speech path, and thereafter returning said echo locator to said pool of echo locators;
   (ii) locating and applying an echo canceller from a pool of echo cancellers to said network speech path for canceling said echo using said pure delay and dispersion time, and thereafter returning said echo canceller to said pool of echo cancellers; and
   (iii) locating and applying a line watchdog from a pool of line watchdogs to said network speech path for detecting the presence or absence of said echo, and in the event the presence of said echo is detected then re-executing (i).

7. The method of claim 6, wherein said echo canceller provides adaptation only in the dispersion time determined by the echo locator, all coefficients beyond the dispersion time being modeled as zero.

8. The method of claim 7, wherein said line watchdog detects the presence or absence of said echo in accordance with pseudo-code comprising:

```
M - decimation factor
Initial values:
max_lag = Tail_End_Delay / M   // Tail_End_Delay - max. echo path delay
Initialize Ncr to max_lag or less
State Watchdog:
BEGIN
    Decimate Rin and store in Rind_buff
    Decimate Sin and store in Sind_buff
    REPEAT
        Cross correlate Rind and Sind over Window Ncr (CRrs)
        Shift Sind relative to Rind
    UNTIL max_lag samples
    IF Sind correlated to Rind
        Flag ECHO PRESENT
        (Go to Echo Locator state)
    ELSE // Sind not correlated to Rind
        Remain in Watchdog state
END.
```

* * * * *